(12) United States Patent  (10) Patent No.: US 8,511,056 B2
Handley et al.  (45) Date of Patent: Aug. 20, 2013

(54) GAS TURBINE ENGINE HAVING A NACELLE AND A BREATHER DUCT

(75) Inventors: Brian A Handley, Derby (GB); Andrew J Mullender, Nottingham (GB); Zahid M Hussain, Derby (GB)

(73) Assignee: Rolls-Royce PLC, London (GB)

( * ) Notice: Subject to any disclaimer, the term of this patent is extended or adjusted under 35 U.S.C. 154(b) by 733 days.

(21) Appl. No.: 12/768,040

(22) Filed: Apr. 27, 2010

(65) Prior Publication Data

US 2010/0293917 A1  Nov. 25, 2010

(30) Foreign Application Priority Data

May 19, 2009 (GB) .................................. 0908540.8

(51) Int. Cl.
*F02C 7/06* (2006.01)
*F02C 6/08* (2006.01)
*F02C 9/18* (2006.01)

(52) U.S. Cl.
USPC ............ 60/39.08; 60/785; 60/795; 60/39.091

(58) Field of Classification Search
USPC ............ 60/782, 785, 795, 801, 39.08, 39.091
See application file for complete search history.

(56) References Cited

U.S. PATENT DOCUMENTS

| 5,080,303 A | | 1/1992 | Hutton |
| 5,104,069 A | * | 4/1992 | Reising .......................... 244/136 |
| 5,285,636 A | * | 2/1994 | Mayo et al. ................. 60/39.094 |
| 5,655,732 A | | 8/1997 | Frank |
| 6,116,015 A | * | 9/2000 | Taylor et al. ................. 60/39.08 |
| 7,546,981 B2 | * | 6/2009 | Hoffjann et al. ............... 244/136 |
| 7,651,055 B2 | * | 1/2010 | Turner et al. ................... 244/136 |
| 2005/0081530 A1 | * | 4/2005 | Bagnall et al. .................. 60/785 |
| 2008/0296439 A1 | * | 12/2008 | Cloft et al. ..................... 244/208 |
| 2008/0298950 A1 | * | 12/2008 | Cloft et al. ..................... 415/4.1 |
| 2009/0133376 A1 | * | 5/2009 | Zysman ....................... 60/39.08 |

FOREIGN PATENT DOCUMENTS

| EP | 0 940 338 A2 | 9/1999 |
| EP | 2 065 303 A2 | 6/2009 |
| GB | 2 446 147 A | 8/2008 |

OTHER PUBLICATIONS

Sep. 7, 2009 Search Report issued in British Patent Application No. 0908540.8.
Search Report issued in corresponding European Application No. 10 16 1150 dated Mar. 4, 2011.

* cited by examiner

*Primary Examiner* — Ehud Gartenberg
*Assistant Examiner* — Karthik Subramanian
(74) *Attorney, Agent, or Firm* — Oliff & Berridge, PLC

(57) ABSTRACT

Breather air, containing oil mist, is discharged from a nacelle 4 of a gas turbine engine through an exhaust port 26 at a surface 22 of the nacelle 4. Energized air, at relatively high velocity is discharged from a clean air outlet 28, and forms a barrier between the breather air and the external surface 22, so preventing contamination of the surface 22 by oil deposited from the breather air.

10 Claims, 3 Drawing Sheets

GAS TURBINE ENGINE HAVING A NACELLE AND A BREATHER DUCT

This invention relates to a gas turbine engine having a nacelle and a breather duct, and is particularly, although not exclusively, concerned with such an engine mounted on an aircraft.

Aircraft mounted gas turbine engines are usually provided with a gearbox which is driven by the engine and provides drive for certain engine accessories. Such gearboxes are oil lubricated and are provided with so-called "breather" outlets in the form of ducts which provide communication between the gearbox interior and the exterior of the engine. This is to ensure that the operation of the gearbox does not result in an air pressure build-up within the gearbox casing. Inevitably, operation of the gearbox results in severe agitation of the oil within the gearbox to the extent that an oil mist is usually formed. This oil mist can escape through the gearbox breather outlet and so it is common to provide a centrifuge device to separate out the oil mist before it is ejected from the engine. Unfortunately such devices are not completely effective in capturing all of the oil mist so that some oil is inevitably lost through the breather outlet. The magnitude of the oil loss under these circumstances is not great and does not normally present any problems in the effective operation of the gearbox. However the oil which is ejected from the breather outlet, which is typically opens at a breather exhaust port which is flush with the surface of the engine nacelle, tends to cause dark coloured stains along the engine nacelle. The problem is particularly acute in the case of nacelles which have a light colour.

Such stains are seen as being highly undesirable since they are unsightly and are very difficult and time consuming to remove by normal cleaning methods.

U.S. Pat. No. 5,080,303 discloses a breather outlet which is in the form of a mast extending outwardly from the engine nacelle, the oil/air mixture from the gearbox being exhausted from the end of the mast remote from the nacelle in a direction generally aligned with the airflow over the nacelle. Such masts cause a certain degree of drag which provides a penalty in terms of overall engine performance. They also add weight to the nacelle.

According to the present invention there is provided a gas turbine engine comprising a nacelle and a breather duct providing communication between a component of the engine within the nacelle and the exterior of the nacelle, the breather duct opening at the exterior of the nacelle at an exhaust port, and a clean air outlet being disposed adjacent the exhaust port to provide, in use, a barrier of clean air between the external surface of the nacelle and a flow of breather air from the exhaust port.

The component may be an oil lubricated component, so that the breather duct carries air containing an oil mist. The component may be a gearbox.

The clean air outlet may be disposed at least partially downstream of the exhaust port. In the context of this specification, the expression "downstream" refers to the direction of air flow over the external surface of the nacelle during normal operation of the engine. In the case of an engine providing propulsion for a vehicle such as an aircraft, the downstream direction will be in the aft direction of the vehicle, with respect to the normal travel direction of the vehicle.

The clean air outlet may comprise a slot. The slot may be arcuate, and in one embodiment is annular, so that it surrounds the exhaust port. The exhaust port may be circular in which case the arcuate or annular slot of the clean air outlet may be concentric with the exhaust port.

The clean air outlet may comprise a porous skin providing the external surface of the nacelle in the region of the exhaust port. The skin may be porous by virtue of perforations in the skin, or by virtue of the skin being made from an open-cell cellular material.

The clean air outlet may be configured to direct clean air in the downstream direction, so recovering propulsive thrust from the discharged clean air. The exhaust port and the clean air outlet may be provided on a mast which projects outwardly of the nacelle surface.

The exhaust port and the clean air outlet may be configured in relation to the respective pressures of the sources of the air flowing from the component through the breather duct and the air flowing through the clean air outlet, so that the speed of the air flowing through the clean air outlet is higher than that of the air flowing through the exhaust port. For example, the flow rate of breather air through the exhaust port may fall in the range from 3 to 120 m/s while the flow of air through the clean air outlet may be in the range from 3 to 350 m/s.

The engine may be a bypass engine, in which case the clean air flow through the clean air outlet is extracted from the bypass flow of the engine. The clean air may be conveyed directly from the bypass duct to the clean air outlet, but alternatively the clean air may be air which has been employed for other purposes within the engine, for example for purging a fire zone of the engine of flammable liquids and gases. It will be appreciated that the expression "clean air" as used in this specification refers to air which is free of any oil mist as is found in the breather air flowing through the breather duct. The clean air may nevertheless contain other contaminants, such as fuel purged from the fire zone, which is volatile or otherwise is not liable to cause staining of the nacelle.

For a better understanding of the present invention, and to show more clearly how it may be carried into effect, reference will now be made, by way of example, to the accompanying drawings, in which.

Figure 1:
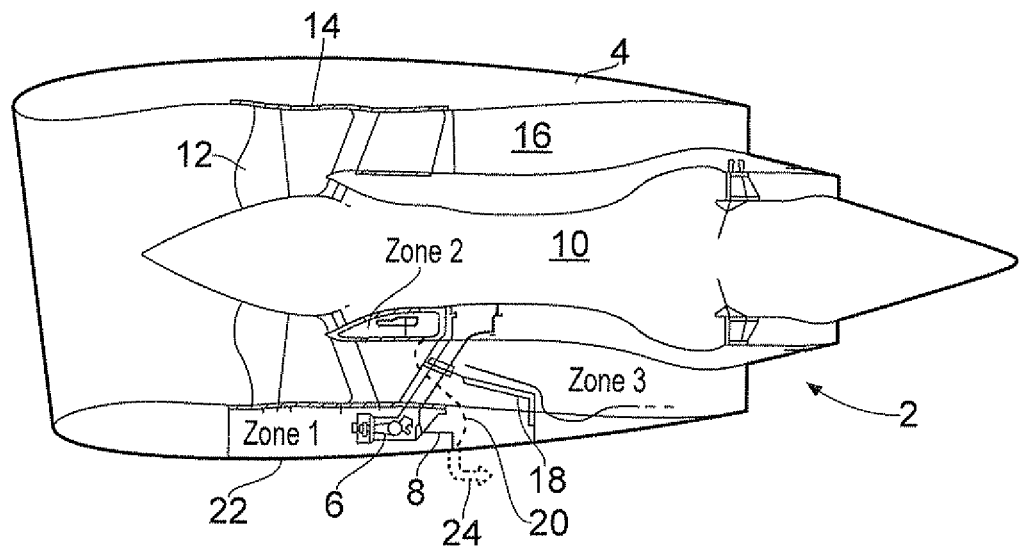
FIG. 1 is a sectional view of a gas turbine engine.

FIG. 1 shows a gas turbine engine 2 provided with a nacelle 4. The gas turbine engine is suspended from an aircraft (not shown) by means of a suitable mounting structure. The gas turbine engine is provided with a gearbox 6 accommodated within the nacelle 4. A breather duct 8, shown only diagrammatically in FIG. 1, extends from the gearbox 6 to the exterior of the nacelle 4.

The engine shown in FIG. 1 is a turbo fan engine comprising a core engine 10 and a fan 12. The fan 12 rotates within a fan casing 14 on which the nacelle 4 is mounted. A bypass duct 16, receiving flow from the fan 12, is provided between the fan casing 14 and the core engine 10.

The engine has fire zones, indicated in FIG. 1 as "Zone 1", "Zone 2" and "Zone 3". These fire zones are isolated from each other to prevent flammable materials, such as leaking fuel, from passing from one zone to another.

Zone 1 and Zone 2 are maintained under positive pressure, for example by means of air extracted from the bypass duct 16. This pressurisation means that any hazardous liquids or gases, such as leaking fuel, which enters any of the fire zones can be discharged externally of the engine. For example, a purging line 20 is diagrammatically shown extending from Zone 2 to the outer surface 22 of the nacelle 4.

As shown in FIG. 1, the breather duct 8 and the purge line 20 reach the outer surface 22 of the nacelle 4 at the same location, to discharge as indicated by an arrow 24.

Zone 3 is formed by a region defined by a bifurcation fairing 18 which is situated in the bypass duct 16 in the lower region of the engine 2. Zone 3 is isolated from the bypass duct 16, the flow through the bypass duct 16 being split by the fairing 18 to pass on either side of it. Zone 3 provides a region through which control and other connections, such as the drive of the gearbox 6, can pass from the core engine 10 to the nacelle 4 and the exterior of the engine. Since, in this example, Zone 3 is maintained at ambient pressure, it cannot act as a source of pressurised gas for use with the present invention.

Figure 2:
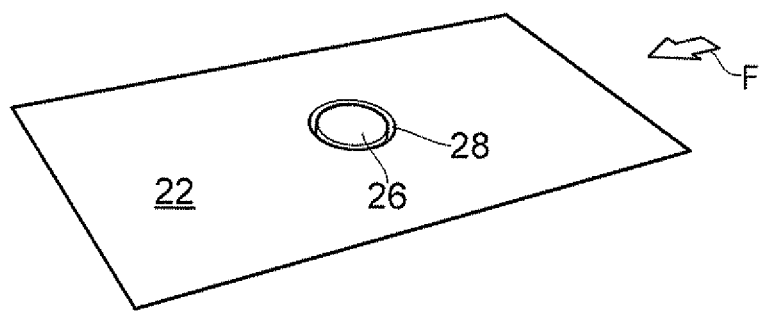
FIG. 2 is a view of an exhaust port of a breather outlet of the engine of FIG. 1.

FIG. 2 is an enlarged view of the external surface 22 at the region where the breather duct 8 and the purge line 20 discharge. The breather duct 8 emerges at a circular exhaust port 26, and the purge line 20 emerges at a clean air outlet 28 which is in the form of an annular slot surrounding the exhaust port 26. The direction of air flow over the external surface 22 is indicated by an arrow F. This air flow F is the flow over the surface 22 caused by forward movement of the aircraft through the air. Typically, in normal level cruising of the aircraft, the speed of the air flow F will be in excess of 200 m/s and, for sub-sonic commercial aircraft, not greater than 350 m/s.

The exhaust port 26 and clean air outlet 28 are substantially flush with the external surface 22 of the nacelle 4. Breather air emerges from the exhaust port 26 with very little energy and so at a relatively low flow rate, usually not more than 120 m/s, under the effect of the modest pressure generated within the gearbox 6. If the clean air outlet 28 were not present, the air flow F would immediately deflect the oil-carrying air emerging from the exhaust port 26, so that it is caused to flow across the external surface 22, allowing the oil mist to be deposited as a dark film over the surface In accordance with the present invention, the clean air discharged from the clean air outlet 28 forms a high energy tubular "sleeve" around the breather air emerging from the exhaust port 26. Consequently, as the emerging air is deflected by the passing air flow F, the clean air from the clean air outlet 28 ejects the breather air forcefully away from the surface 22, and forms a barrier between the external surface 22 and the oil-carrying breather air emerging from the exhaust port 26. Consequently, the breather air does not come into contact with the external surface 22 of the nacelle 4 but instead is swept past the trailing edge 30 of the nacelle 4 by the passing air flow F.

The clean air outlet 28 may be configured so that the clean air emerging from it is travelling at a higher speed than the air flow F. The clean air flowing through the purge line 20 is driven by the pressure maintained in Zone 2, which is typically at, or close to, the fan-generated pressure in the bypass duct 16. The flow through the clean air outlet 28 is thus a high-energy flow, and its speed may be similar to, or greater than, that of the air flow F. The clean air passing through the clean air outlet 28 will thus have sufficient energy to project by a substantial distance from the external surface 22 before it is deflected by the passing air flow F, and so will flow over the external surface 22 at some distance, at the same time shielding the external surface 22 from the oil-containing breather air.

The respective flow rates of air from the exhaust port 26 and the clean air outlet 28 will vary widely with changing engine power settings. In general, the velocity of the shielding flow of air through the clean air outlet 26 will be greater than that of the breather air emerging from the exhaust outlet 26. Typically, at a take-off power setting, the flow rate or velocity of the air passing through the clean air outlet 28 will be at least twice that of the breather air emerging from the exhaust port 26. Under other conditions, for example on descent, the breather air flow rate will be at much lower speeds than the aircraft speed (ie the speed of the air flow F).

Figure 3:
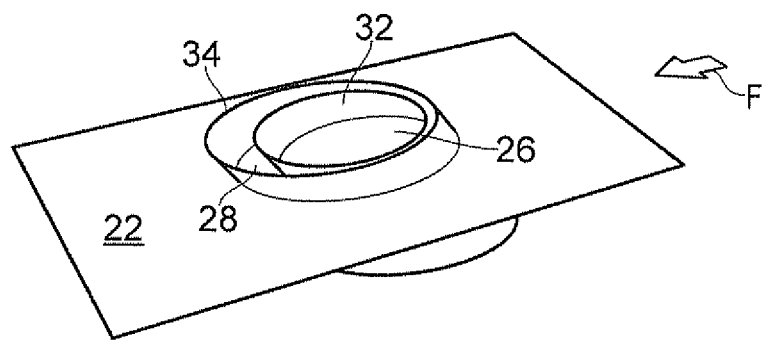
FIGS. 3 to 8 correspond to FIG. 2 but show variants of the exhaust port.

FIG. 3 shows an alternative embodiment in which the exhaust port 26 and the clean air outlet 28 are formed at the ends of short upstands 32, 34 which project outwardly beyond the external surface 22 of the nacelle 4. Also, the upstands 32, 34, and consequently the exhaust port 26 and the annular clean air outlet 28 are non-circular (e.g. elliptical) and not coaxial with each other. The result of this configuration is that the annular clean air outlet 28 is wider on the downstream side of the exhaust port 26 than on the upstream side, with respect to the direction of air flow F. The volume of clean air ejected from the clean air outlet 28 is consequently greater on the side of the exhaust port 26 towards which the outflowing air is deflected by the passing air flow F. This greater volume of clean air between the external surface 22 and the flow of breather air from the exhaust port 26 minimises the possibility of contact of the breather air with the external surface 22.

An additional feature of the variant shown in FIG. 3 is that the upstands 32, 34, and the regions of the breather duct and purge line 20 on the internal side of the skin of the nacelle 4, are inclined obliquely to the normal from the external surface 22. The direction of inclination is such that air issuing from the exhaust port 26 and the clean air outlet 28 has a component in the downstream direction, and consequently enables some thrust recovery to be achieved from the clean air extracted from the bypass duct 16.

Figure 4:
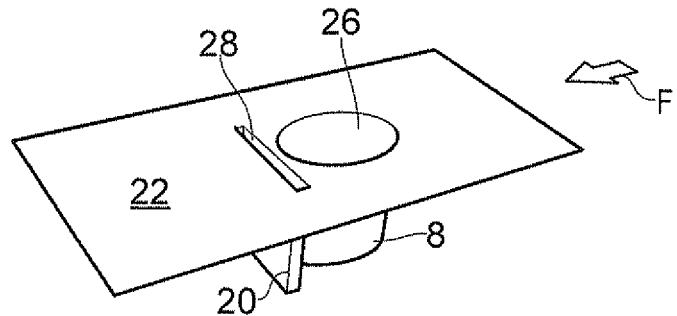

FIG. 4 shows a variant in which the clean air outlet 28 is in the form of a straight slot situated downstream of the exhaust port 26 for the breather air. This configuration provides a clean air barrier downstream of the exhaust port 26 to prevent re-attachment of the breather air, issuing from the exhaust port 26, to the external surface 22.

Figure 5:
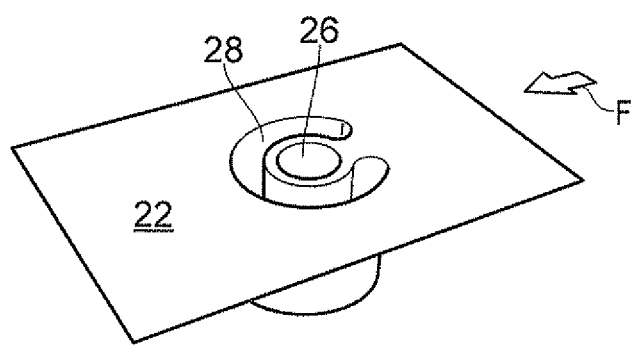

FIG. 5 shows a variant of the configuration of FIG. 4, in which the slot forming the clean air outlet 28 is arcuate, extending partially around the exhaust port 26.

Figure 6:
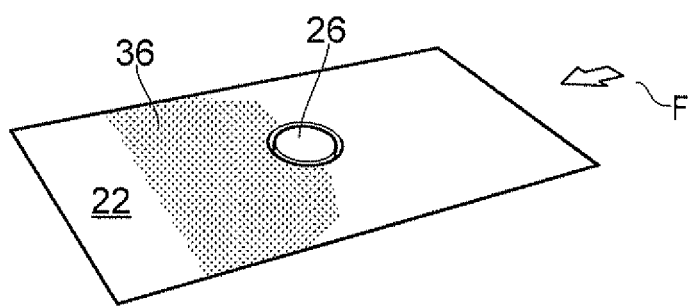

A further variant is shown in FIG. 6, in which the clean air outlet takes the form of a porous region 36 of the skin of the nacelle 4. The porous region may extend substantially entirely on the downstream side of the exhaust port 26, as shown in FIG. 6, or could also extend over an upstream region of the skin.

In the embodiment of FIG. 6, the porous region 36 comprises an array of small holes in the skin, but in an alternative embodiment the porous region could be constituted by a skin insert made from a porous material, such as an open-cell cellular material or expanded metal or mesh.

Figure 7:
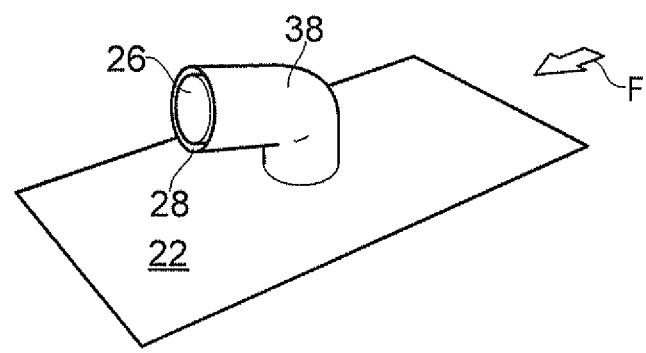

As shown in FIG. 7 it is possible for the exhaust port 26 and the clean air outlet 28 to be provided on a mast 38 projecting from the external surface 22. The drag created by the mast 38 is lower than that of known breather masts. This is because the mast 38 can be of smaller size than the known masts, since the energised, or pressurised, clean air issuing from the clean air outlet 28 results in an increased flow velocity, requiring a reduced cross-sectional area of the mast 38. The mast 38 is oriented in the downstream direction, so as to achieve thrust recovery from the air extracted from the bypass duct 16.

Figure 8:
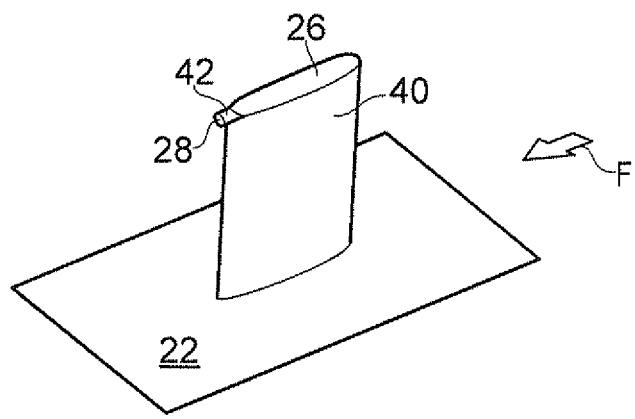

FIG. 8 shows an alternative mast configuration, which utilises a mast 40, having an aerodynamic profile directed towards the air flow F. The end of the mast 40 away from the external surface 22 is closed, while a separate nozzle 42 provides the exhaust port 26 for the breather air and the clean air outlet 28 disposed concentrically one within the other. As with the preceding embodiments, the clean air issuing from the clean air outlet 28 forms a barrier between the breather air issuing from the exhaust port 26 and the external surface 22 of the nacelle 4.

Although, in the embodiments described above, the clean air issuing from the clean air port 28 is the purge air supplied along the purge line 20, and consequently can be considered to be waste air which has served the purpose of discharging any accumulated fluids or gases from the fire zone (i.e. Zone 2), it would be possible to use purge air supplied from any zone or region which is maintained at positive pressure, or use a dedicated air supply conveyed directly from the bypass duct 16 to the clean air outlet 28.

The configuration and flow cross-section of the clean air outlet 28, and the distance by which the exhaust port 26 and clean air outlet 28 are spaced from the external surface 22, can be modified to provide a desired compromise between the required flow rate of energetic air, which is lost from the bypass duct, and the drag induced by the projecting components.

Although, in the schematic view shown in FIG. 1, the outflow of breather air and clean air is shown as taking place at the bottom of the engine 2, it will be appreciated that the respective outlets could be provided at any convenient position around the external surface 22 of the nacelle 4.

The invention claimed is:

1. A gas turbine engine comprising a nacelle and a breather duct providing communication between a component of the engine within the nacelle and the exterior of the nacelle, the breather duct opening at the exterior of the nacelle at a circular exhaust port, and a clean air outlet being disposed adjacent the exhaust port, the clean air outlet comprising an annular slot concentric with the exhaust port, to provide, in use, a barrier of clean air between the external surface of the nacelle and a flow of breather air from the exhaust port.

2. A gas turbine engine as claimed in claim 1, in which the component is an oil lubricated component.

3. A gas turbine engine as claimed in claim 2, in which the component is a gearbox.

4. A gas turbine engine as claimed in claim 1, in which the clean air outlet is disposed at least partially downstream of the exhaust port.

5. A gas turbine engine as claimed in claim 1, in which the clean air outlet comprises a porous skin providing the external surface of the nacelle in the region of the exhaust port.

6. A gas turbine engine as claimed in claim 1, in which the clean air outlet is configured to direct clean air in a downstream direction.

7. A gas turbine engine as claimed in claim 1, in which the exhaust port and the clean air outlet are provided on a mast which projects outwardly of the nacelle.

8. A gas turbine engine as claimed in claim 1, in which, in normal operation of the engine, the flow rate of air from the clean air outlet is greater than the flow rate of air from the exhaust port.

9. A gas turbine engine as claimed in claim 1, in which the clean air is supplied to the clean air outlet from a bypass duct of the engine.

10. A gas turbine engine as claimed in claim 5, in which the clean air is supplied from the bypass duct through a fire zone of the engine.

* * * * *